No. 632,028. Patented Aug. 29, 1899.
J. O. SMITH.
ADJUSTABLE CLENCHER FOR PNEUMATIC TIRES.
(Application filed Jan. 14, 1899.)
(No Model.)
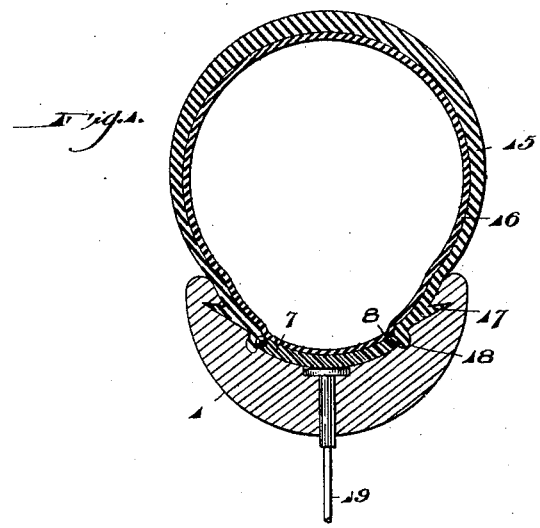
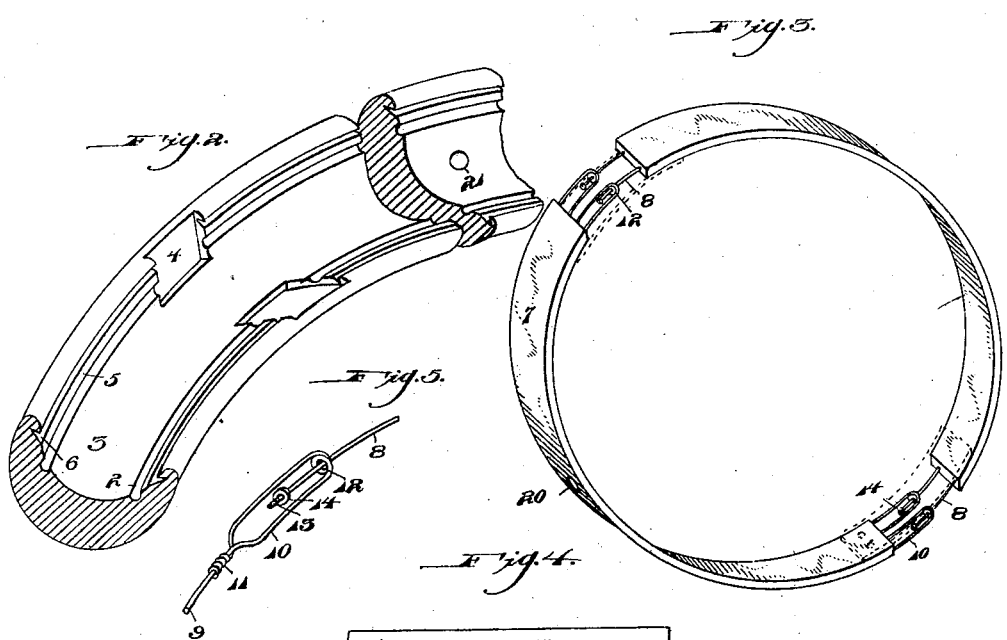
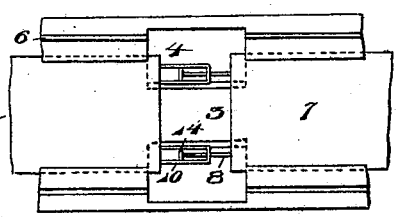
WITNESSES:
INVENTOR
J. O. Smith.
BY
ATTORNEYS.

UNITED STATES PATENT OFFICE.

JAMES O. SMITH, OF PITTSBURG, PENNSYLVANIA.

ADJUSTABLE CLENCHER FOR PNEUMATIC TIRES.

SPECIFICATION forming part of Letters Patent No. 632,028, dated August 29, 1899.

Application filed January 14, 1899. Serial No. 702,141. (No model.)

*To all whom it may concern:*

Be it known that I, JAMES O. SMITH, a citizen of the United States of America, residing at Pittsburg, in the county of Allegheny and State of Pennsylvania, have invented certain new and useful Improvements in Adjustable Clenchers for Pneumatic Tires, of which the following is a specification, reference being had therein to the accompanying drawings.

My invention relates to certain new and useful improvements in clenchers for pneumatic tires.

My invention particularly relates to providing novel means for securing a pneumatic tire in position by means of the casing, which is secured to the rim.

This invention relates to that type of pneumatic or air-cushion tires which are slitted or divided at their inner side and have the edge of the slit provided with annular seats in or on the rim of a bicycle or other wheel.

A further object of my invention is to improve prior tires of this type and provide novel means whereby the tire can be securely held and confined when inflated, the wheel-rim to which the tire is to be secured having a suitable groove which is adapted to receive an adjustable fastening-band for securing the clenched portion of the outer casing in position, thereby preventing the separation of the tire proper from the rim.

A further object of my invention is to provide an adjustable fastening device constructed of two sections secured together by a pair of eyes having a pair of rods operated therethrough to allow of the adjustability of the fastening means. This fastening means may be constructed of any desirable fabric.

A further object of my invention is to provide a strong, durable, and efficient tired wheel materially simplified and its manufacture economized, while enabling repairs to be conveniently and quickly effected by the means heretofore described so that an unskilled person can readily remove and replace the tire without the provision of special tools and appliances and without disturbing any part of the wheel-rim.

My invention finally consists in the novel combination and arrangement of parts hereinafter more fully described, and particularly pointed out in the claims.

In describing the invention in detail reference is had to the accompanying drawings, forming a part of this specification, wherein like numerals of reference indicate corresponding parts throughout the several views thereof, and in which—

Figure 1 is a cross-sectional view of the rim of a tire shown to illustrate my invention, the parts being in the positions they keep when the tire is inflated. Fig. 2 is a perspective view of a portion of a rim of a wheel, showing the slits arranged therein to allow of the operation of the connecting ends and the fastening means. Fig. 3 is a perspective view of my improved fastening-band. Fig. 4 is a top plan view of a portion of a rim of a wheel, showing the connecting means for the fastening-band arranged therein. Fig. 5 is a perspective view of one of the locking ends of the fastening-band.

Referring to the drawings by reference-numerals, 1 indicates a wheel-rim, which may be composed of wood or any other material suitable for the conditions required. I prefer to employ wood in that it provides a lighter wheel, and my invention enables a wooden rim to be used without special reinforcements to secure the proper strength. The outer face of the rim is substantially semispherical in contour, and the edge is provided with a pair of annular grooves 2, which are also semispherical in cross-section, or approximately so, and are separated from each other by an intervening bridge-piece or annular rib 3 of a desired width and may be formed curvilinear, as shown, or with a flat or flattened surface, if desired. The annular grooves 2 are interrupted diametrically opposite each other by the cut-away portion 4, which may be of circular or oblong formation, arranged on the outer face of the tire, as shown. Formed on the outer face of the tire upon the grooves 2 and separated therefrom by means of the annular bridge 5 is the groove 6. This groove 6 is substantially V-shaped, although the lower side thereof is of greater length than the upper side. The bridge 5, as well as the V-shaped groove 6, is interrupted in the same manner as the annular grooves 2 by means of the cut-away portion 4.

7 indicates a flexible fastening-band of any desirable material and formed of two sections, as shown. This flexible supporting-band is of sufficient width to allow of the incorporation therein of the strengthening-rods 8 9. These strengthening-rods are usually constructed of flexible wire and have one of their ends, as at 10, bent upon itself and secured upon itself, as at 11, by coiling the wire thereof. The outer end of the bent portion 10 has formed therein an eye 12 by the looping of the wire, as shown. This construction is made on the ends of the rod 9. The ends of the strengthening-rod 8 are screw-threaded, as at 13, and are adapted to receive the fastening-nut 14. The end of the wire or rod 8 operates through the eye 12, formed on the end of the strengthening-rod 9, as shown. This allows of the adjustment of the flexible fastening-band 7. This band is adapted to rest on the bridge portion 3 of the tire and the adjustable ends of the strengthening-rods in the cut-away portion 4, formed on the outer face of the rim of the tire.

15 indicates an outer casing which is used for surrounding the inflated tire or inner tube 16. The outer casing or tube 15 secures the tire 16 in position by means of the portion of the same, as at 17, fitting into the V-shaped recess 6, and a portion 18, fitting into the annular grooves 2, and the operation against the same of the edge of the fastening-band 7, this fastening means being clearly shown in Fig. 1 of the drawings.

19 indicates a spoke of a wheel, and 20 an aperture formed in the fastening-band to allow of the inflation-tube to be inserted therethrough for filling the tire 16. 21 indicates an aperture formed in the rim to allow also of the operation therethrough of the inflation-tube.

The adaptation for tires of this kind of my improved adjustable supporting-band the same will securely hold the outer casing for the inner tire in position, and as the casing or tire is enlarged by the means of inflation the adjustable fastening-band always securely holds the same in position. A pneumatic or air-cushion tire may be of any material suitable for the conditions desired as well as the outer casing 15. It is evident that the outer casing is so divided at its inner side so as to provide two opposite edge portions, as shown, so that the inner tire can be readily removed and replaced. It will also be observed that when the outer casing is in position the flexible fastening-band, as well as the strengthening-rods therefor, is operated against the edges of the outer casing and will prevent the same from being removed.

Pneumatic tires have been constructed with thickened edges held in grooves of the wheel-rim by a clamping-band; but in prior constructions ordinarily used the clamping-band is movable laterally or is contractible circumferentially without the use of a pair of strengthening-rods, by which the outer casing is held in the desired position.

It is thought that the many advantages of my improved construction can be readily understood from the foregoing description, taken in connection with the accompanying drawings.

It will be noted that various changes may be made in the details of construction without departing from the general spirit of my invention.

Having thus fully described my invention, what I claim as new, and desire to secure by Letters Patent, is—

1. In a tire of the class described, the combination with a rim having a pair of annular grooves substantially semispherical in cross-section, said rim being also provided with a pair of annular V-shaped grooves and with cut-away portions intersecting said semispherical and V-shaped grooves, of a fastening-band formed in two sections adjustably secured to the wheel-rim and extending to the inner edge of the annular grooves, an inflatable inner tire or tube, and an outer casing or tube surrounding said inner tire or tube, and having securing means engaging the annular and V-shaped grooves in the rim, substantially as described.

2. In a tire of the class described, the combination with a wheel-rim provided on its inner face with annular grooves and a pair of V-shaped grooves arranged at the outer side of the annular grooves, of an inflatable inner tire or tube, an outer casing or tube surrounding said inner tire or tube, means carried by said outer casing or tube to engage in said grooves in the wheel-rim, and a fastening-band formed in sections adjustably connected together with its edges abutting against the edges of the outer casing or tube to hold the said casing or tube in position, substantially as described.

3. The combination of a wheel-rim having a pair of annular grooves substantially semispherical in cross-section said wheel-rim provided with a pair of V-shaped grooves above the semispherical grooves, an annular band formed of two sections adjustably secured to the wheel-rim and extending to the edge of the annular grooves, an inflatable tire, and an outer casing surrounding said inflatable tire adapted to be secured to the wheel-rim, substantially as shown and described.

4. The combination of a wheel-rim having a pair of annular grooves substantially semispherical in cross-section, said wheel-rim provided with a pair of V-shaped grooves, said wheel-rim also provided with a bridge between the two annular grooves, an inflatable tire, a slitted or divided casing adapted to surround said inflatable tire and to be secured in the grooves, a fastening-band formed of two sections adapted to be mounted on the said bridge, strengthening-rods arranged in the said fastening-band, and means arranged on the said strengthening-rods to allow of the adjusting of the same, substantially as set forth.

In testimony whereof I affix my signature in the presence of two witnesses.

JAMES O. SMITH.

Witnesses:
N. L. BOGAN,
H. H. PATTERSON.